(12) United States Patent
Kendall

(10) Patent No.: US 6,836,816 B2
(45) Date of Patent: Dec. 28, 2004

(54) FLASH MEMORY LOW-LATENCY CACHE

(75) Inventor: Terry L. Kendall, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 09/820,243

(22) Filed: Mar. 28, 2001

(65) Prior Publication Data

US 2002/0144059 A1 Oct. 3, 2002

(51) Int. Cl.[7] .............................................. G06F 12/08
(52) U.S. Cl. ...................................... 711/3; 711/118
(58) Field of Search ............................. 711/3, 101, 103, 711/118, 119, 120, 121, 122, 123, 126, 167, 170

(56) References Cited

U.S. PATENT DOCUMENTS

| | | | | |
|---|---|---|---|---|
| 5,596,731 A | * | 1/1997 | Martinez et al. | 710/305 |
| 5,787,486 A | * | 7/1998 | Chin et al. | 711/163 |
| 5,875,451 A | * | 2/1999 | Joseph | 711/105 |
| 5,926,839 A | * | 7/1999 | Katayama | 711/169 |
| 6,263,398 B1 | * | 7/2001 | Taylor et al. | 711/3 |
| 6,288,923 B1 | * | 9/2001 | Sakamoto | 365/49 |
| 6,347,055 B1 | * | 2/2002 | Motomura | 365/189.05 |

OTHER PUBLICATIONS

"10ns EDRAM Product Addendum", Enhanced Memory Systems Inc., 1997.*

* cited by examiner

*Primary Examiner*—Gary Portka
(74) *Attorney, Agent, or Firm*—Blakely, Sokoloff, Taylor & Zafman LLP

(57) ABSTRACT

A small cache memory can be incorporated with a main memory, such as a flash memory, on an integrated circuit to improve average access times between a processor and the main memory. To minimize cost and complexity, the cache memory may contain only a few words of data. The cache can also allow a suspended transfer with minimal latency when the transfer is resumed. Designing the cache memory to interface with the processor over a standard memory bus permits the cache to be implemented in a system that could otherwise have no cache memory unless the processor and/or memory bus were redesigned.

19 Claims, 6 Drawing Sheets

FLASH MEMORY LOW-LATENCY CACHE

BACKGROUND OF THE INVENTION

1. Field of the Invention

The invention pertains generally to computers. In particular, it pertains to computer memory.

2. Description of the Related Art

Due to their respective technological developments, computer processor speeds have increased faster than computer memory speeds, resulting in a disparity between the operational speed of the processor and the operational speed of the main memory that supplies that processor with instructions and data. This can cause the processor to remain idle while waiting for a requested instruction or data word to be returned from main memory. This problem has been addressed by using cache memory. A cache memory is a memory that is faster, but more expensive and therefore smaller, than the main memory. During operation, the cache memory can be loaded with the most recently used instructions and data from main memory, and a subsequent access to those same locations can be retrieved from the fast cache memory rather than the slower main memory. Although loading the instructions/data into cache creates its own overhead burdens, this approach is effective because computer software typically executes the same code repetitively. Thus, once the particular instructions have been loaded into cache, they can be repeatedly accessed from cache and executed more quickly than if they had to be retrieved from main memory every time.

Conventional computer systems place at least some of the cache memory in the processor chip. This speeds up cache access even more by eliminating the capacitive effects of driving signals between chips. If the cache is too big to fit on the processor chip, some of it can be located on a cache chip that is located close to the processor chip to reduce those inter-chip capacitive effects. The main memory is typically located further away from the processor chip. Since main memory is comparatively slow, the additional capacitive effects caused by this greater distance may not make any difference in the effective access speed of main memory.

Although cache memories are feasible in personal computers and larger computer systems, many applications require a small, embedded processor to perform a few dedicated functions, and the additional cost of even a small standard cache memory would make the final product economically unfeasible. These systems typically do not use a cache memory, and must accept the slow access speeds of their memory, even though the processor may be capable of much higher speeds. Many of these systems use flash memory, or some other form of electrically erasable programmable read-only memory (EEPROM), for a main memory because the devices require a non-volatile memory to preserve the data and instructions when the device is powered off.

FIG. 1 shows a conventional embedded system 1, with a processor (CPU) 11 accessing instructions and data from a flash memory array 13 in a flash memory 12. The flash memory of the example can transfer multiple data words in a burst, and is therefore referred to as a burst flash. CPU 11 and flash memory 12 communicate with each other over a bus 14. The bus of the example has multiple address lines to send a memory address to memory 12, multiple data lines to transfer data to/from the addressed memory location in memory array 13, various control lines to control these transfers, and a WAIT# line. When CPU 11 makes a read request to memory 12, memory 12 uses the WAIT# line to signal CPU 11 to wait until memory 12 has the requested data available. Even in flash memory, which can have read access speeds that are comparable to static random access memory (SRAM), this wait may last for several clock cycles due to the need to turn on various bit lines, word lines, and source lines before the selected memory cells can be accessed, and the need to compare analog voltages after the cells are accessed. This delay, controlled by the WAIT# line, is the mechanism used to integrate the fast CPU with the much slower memory. Interface 15 is used to connect the various bus signals to flash memory 12, and to control the flow of signals between flash array 13 and bus 14.

FIG. 2 shows a timing diagram of a typical transfer over bus 14. The clock signal CLK provides overall timing synchronization for the other bus signals. Multiple address lines ADR provide the memory addresses A1, A2, A3 or A4 of the requested data words D1, D2, D3 or D4 to be read from memory, while address-valid signal ADV# indicates when the address lines are valid. Chip select CE# and output enable OE# provide other control signals that are known in the art. When memory 12 sees a valid address, it asserts the wait signal WAIT# until it has the requested data available. When WAIT# is released (goes from low to high), the subsequent CLK cycles are used to time the reading of the now-available data from the memory over the DATA lines. In the example of FIG. 2, the WAIT process causes each request to take about six clock cycles to complete, even if the same data is being re-requested, as is the case for words D1 and D2 in FIG. 2. Most of those cycles represent idle time for the CPU, thus wasting much of its capability.

DETAILED DESCRIPTION OF THE INVENTION

Various embodiments of the invention provide a small cache memory to provide faster average access to instructions and data by the processor.

Figure 1:
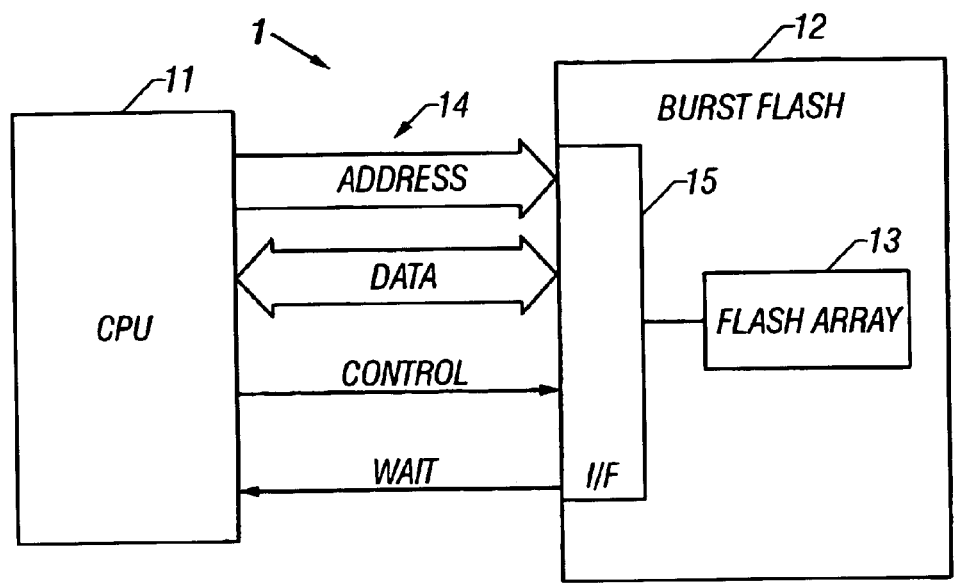
FIG. 1 shows a conventional system without cache memory.
Figure 3:
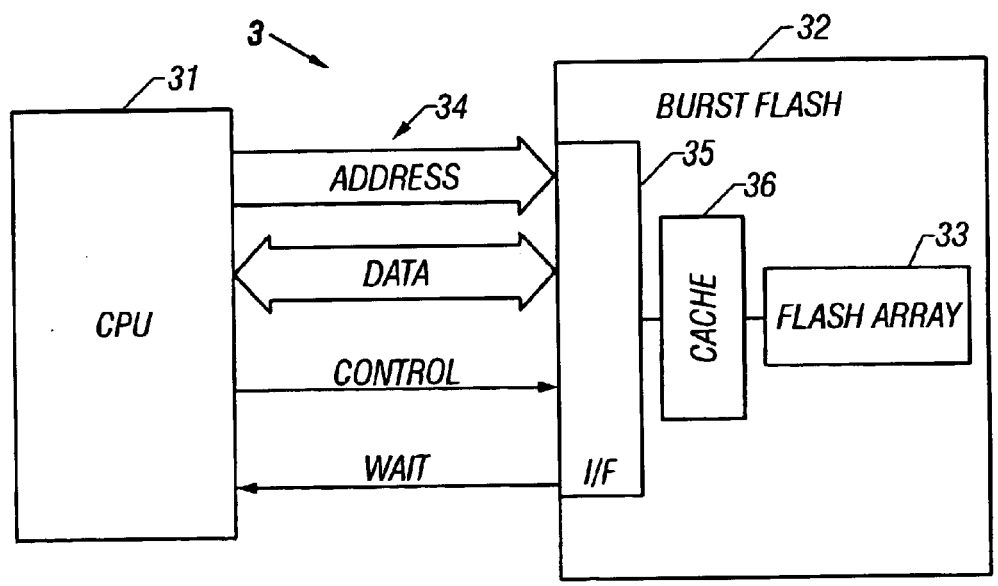
FIG. 3 shows system with a cache memory.
Figure 2:
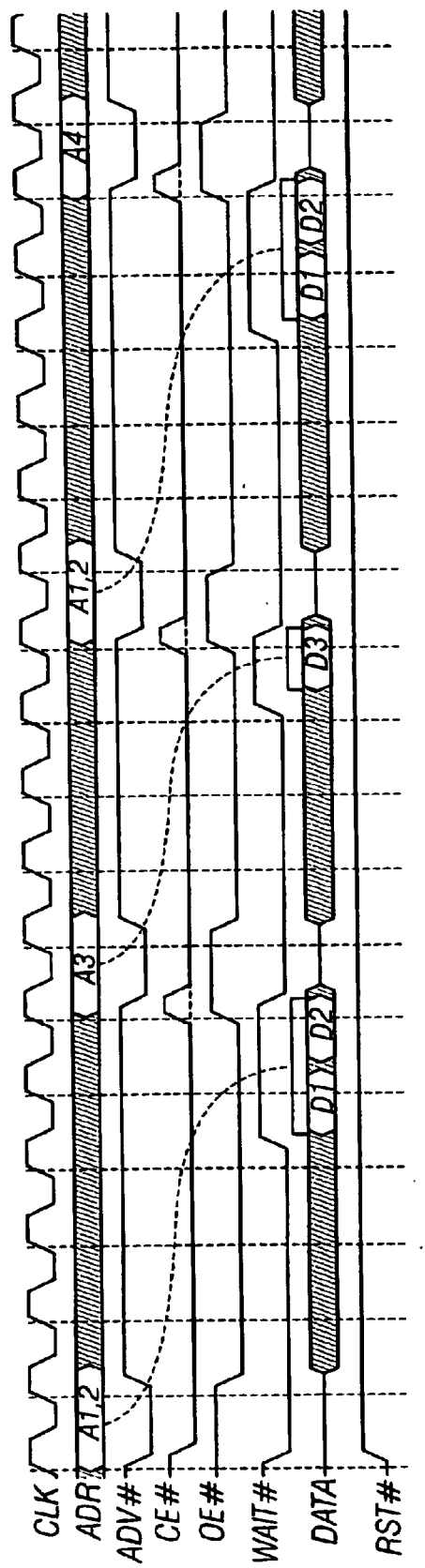
FIG. 2 shows a timing diagram of bus transfers in the system of FIG. 1.

FIG. 3 shows one embodiment of a system 3. CPU 31 can communicate with memory 32 over bus 34. Interface 35 can be used to connect the various bus signals to memory 32, and to control the flow of signals between memory array 33 and bus 34. In the illustrated embodiment, array 33 can be a flash memory array as indicated in FIG. 3. In one embodiment, CPU 31, bus 34, interface 35 and array 33 can be conventional circuits in those respective functional areas. However, unlike conventional systems, system 3 includes a cache memory 36 coupled between interface 35 and array 33. Cache memory 36 can include cache controller logic to control the operation of the cache. Which one embodiment, cache memory 36 and main memory array 33 are on the same integrated circuit. In another embodiment, cache memory 36, main memory array 33, and CPU 31 are all on the same integrated circuit. In another embodiment, the cache controller can be designed to operate with a conventional memory array and conventional memory interface so that the cache can be incorporated into existing designs without redesigning the array, memory interface, or software for accessing memory.

Figure 4:
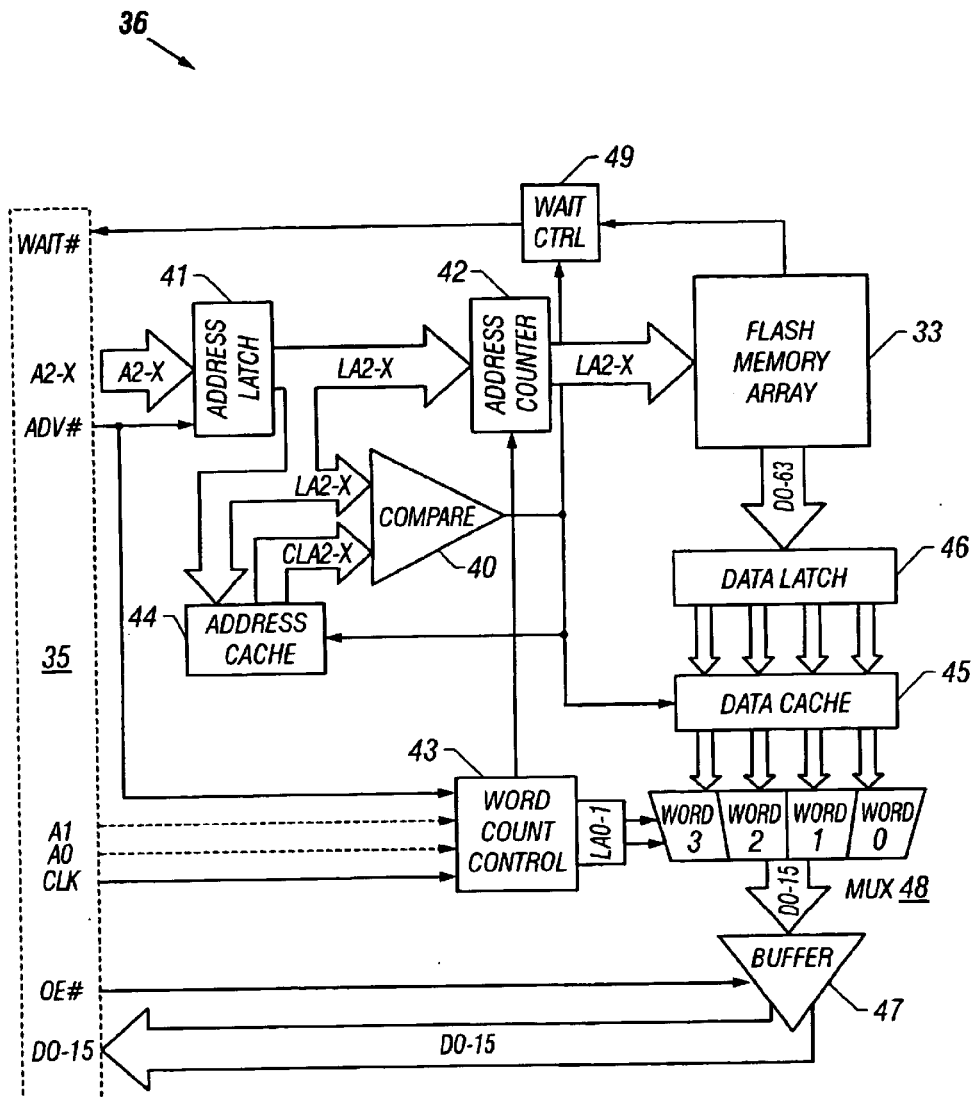
FIG. 4 shows a more detailed view of the cache memory.

FIG. 4 shows a more detailed view of one embodiment of cache memory 36. In this embodiment, all the elements of FIG. 4 except for array 33 may be considered part of cache memory 36 as shown in FIG. 3. Array 33 contains an addressable matrix of memory cells, which can be arranged in one or more blocks, in a manner known to those of skill in the art. The signals WAIT#, ADV# (address valid), A0-Ax (address bits), CLK (clock), and OE# (output enable) can be buffered signals from bus 34. Data output signals D0–D15 can be signals placed directly on bus 34 by cache memory 36 in response to a read request. The same data lines can also be used to provide data to array 33 during a write operation, but this is not shown since FIG. 4 is being used only to illustrate the logic for a read operation.

When a particular address in array 33 is to be selected for reading, address bits A0 through Ax may be received to define the address of the selected location. Since the number of address lines needed depends on the amount of addressable memory, which may vary from product to product, the most significant address bit is generically designated as Ax.

In the illustrated embodiment, address lines A0 through Ax define a particular word (16 bits), but to improve overall memory access speed, data can be read out of array 33 in four parallel words, knows as a quadword, and shown as data bits D0–D63. Therefore, the two least significant bits (A0, A1) of the address need not be presented to array 33, but can be used to distinguish which of the four words is selected after the quadword has been read out of array 33 and latched. The overall operation of the illustrated embodiment of cache memory 36 is as follows:

Addresses and the associated data that have been previously cached and retained, through a procedure described later, are stored in address cache 44 and data cache 45. In one embodiment, the depth of these caches is four quadwords, so that the four most recently accessed quadwords, and their associated quadword addresses, are stored here. Caches with other depths may also be used.

When a particular location in memory array 33 is selected for reading, the address is placed on the address lines of bus 34. Bits A2-Ax, i.e., all but the two least significant bits of this address, can be latched into address latch 41, which then contains the address of the indicated quadword. In one embodiment, the address bits are latched into latch 41 on the trailing (rising) edge of the address valid signal ADV#, which is a conventional bus signal used for this purpose. The two least significant bits, i.e., A0 and A1, can be latched into latch/counter 43 and saved for later use. Latched quadword address bits LA2 through LAx can then be compared by comparator 40 to the quadword addresses currently stored in address cache 44, which are shown as cached address bits CLA2 through CLAx. Address cache 44 contains the addresses of the quadwords that were previously accessed and that are currently stored in cache memory. In one embodiment, there are four addresses stored in address cache 44. Various methods of comparing a given address to all the addresses stored in a cache memory are known in the art, and are not discussed here in further detail.

If there is a cache miss, i.e., if the comparison determines that the latched address is not stored in address cache 44, the quadword address can then be stored in counter 42, where it is used to select the first designated quadword in array 33, and can later be used to increment the address for subsequent quadwords in a burst transfer. A signal from comparator 40 can also be sent to wait control logic 49, which asserts the WAIT# signal at this time to tell the CPU that it will have to wait until the requested read data is available. Once the requested address in array 33 has been accessed, the outputs of the 64 memory cells at the designated quadword address can then be latched in latch 46, which in turn outputs the data to data cache 45 and presents the same data to multiplexer 48. At this time, array 33 can also send a signal to wait control logic 49 to deassert the WAIT# signal, as the requested data will be available on the next clock cycle. Data cache 45 stores the data that was retrieved from array 33, while the associated address is also stored in address cache 44. Address cache 44 and data cache 45 therefore combine to store the data and associated addresses that are held in cache memory at any given time.

Unlike conventional cache memories, which may be large enough to store tens of thousands of bytes, data cache 45 might only have room for a few words of data. In one embodiment, address cache 44 and data cache 45 each have four locations, which can collectively store four quadwords of data and their four associated addresses at any given time. Inserting the new data into data cache 45 may result in older data being ejected from data cache 45 to make room for the new data. In a similar manner, the address associated with the new data can be inserted into address cache 44, while the address associated with the ejected data will also be ejected. Various techniques can be used to determine which older data/address is ejected. In one embodiment, a least-recently used (LRU) algorithm can cause ejection of the data/address that has been least recently accessed.

When the data from array 33 has been presented to multiplexer 48, the data is ready to be transferred back to the requesting CPU over bus 34. In the illustrated embodiment, bus 34 has 16 data lines to carry the 16 data signals D0 through D15. If only one word of data was requested, the latched address lines A0 and A1 can be used to select which of the four words of the quadword are to be output by multiplexer 48 and transferred over the bus. If 2, 3, or 4 words of data were requested, those words can be transferred sequentially in a burst mode. The CLK input of latch/counter 43 can be used to increment the starting value of A0–A1, thereby sequentially selecting each of the requested words with multiplexer 48. Output enable signal OE# can be used to enable the outputs D0–D15 of buffer 47 for each transfer. This completes the process that may be used when a read request results in a cache miss.

A cache hit can result in a somewhat different process. If comparator 40 determines that the new address in latch 41 is already stored in address cache 44, then the data corresponding to that address can be retrieved from data cache 45 and immediately presented to multiplexer 48. In one embodiment, a signal is still sent to wait control logic 49 to assert WAIT#, but only for one clock cycle rather than the multiple clock cycles required when the data must be read from array 33. Since the data retrieved from data cache 45 is in the form of a 64-bit quadword, address bits A0 and A1 can again be used to select which of the four words will be transferred over data bits D0–D15. As before, a single word can be transferred or a burst of two, three, or all four words can be transferred sequentially. In one embodiment, when a cache hit is found, the address in the read request is prevented from being presented to array 33, so that array 33 remains undisturbed and ready for any subsequent request that results in a cache miss. This approach can also avoid the necessity to block the requested data from being placed into cache a second time, which would result in a double entry of the requested quadword and an unnecessary ejection of another quadword from cache.

As is known in the art, a burst transfer over bus 34 can be suspended by being interrupted by a higher-priority transfer, and later resumed at the point of interruption. For example, a burst transfer of four words might be suspended after transferring the first two words, and then later resumed by transferring the last two words. When this happens in a conventional system, the memory's output latch is flushed by the suspension so that any higher priority read data can be retrieved from memory through that same output latch. When the suspended transfer is resumed, the memory array must be accessed again to re-obtain the requested data. This causes another WAIT delay of several clock cycles, similar to the original delay that was incurred by the original read request.

In the embodiment of FIG. 4, this delay can be avoided. Even though latch 46 might be flushed by the suspension, the originally requested data can still be obtained from data cache 45. Therefore when the suspended transfer is resumed, the still-untransferred words can be retrieved from data cache 45 without having to again access array 33. Even if the data was not located in cache memory prior to the original read request, the process of retrieving it from array 33 places the data into cache memory so that it is located in cache at the time of the suspension.

Figure 5:
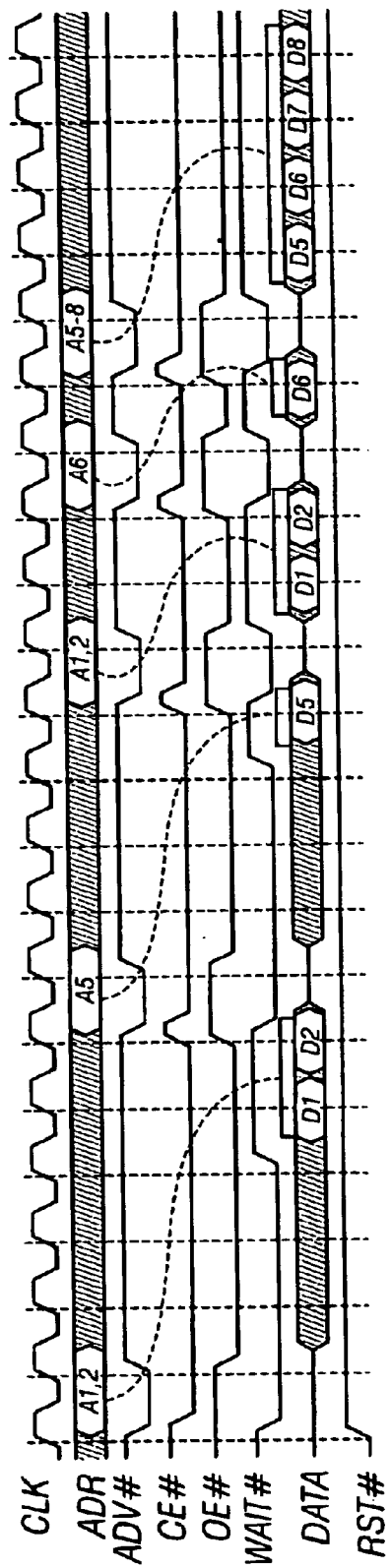
FIG. 5 shows a timing diagram for the system of FIG. 3.

FIG. 5 shows a timing diagram of multiple transfers over bus 34 when the cache memory is used. FIG. 5 is illustrative of a particular embodiment using a particular bus 34. Other embodiments and other buses can also be employed without departing from the spirit of the invention. The information requested from memory is consistently referred to herein as 'data', although in other contexts some of it might be referred to as 'instructions'. The distinction between data and instructions relates only to how the information is handled once the CPU receives it. Since the invention deals with the retrieval of the information, rather than its intended usage by a CPU, the term 'data' as used herein is intended to include any type of requested information without regard to its intended usage by a CPU or other operational entity. In those systems that separate data and instruction storage into two separate memories, one memory array and associated cache memory can be used for instructions to be executed by the CPU, and/or another array and associated cache can be used for data to be operated upon by the instructions. In that case, each array and associated cache can be individually represented by the logic of FIG. 4 if desired.

In FIG. 5, the address lines ADR show the address of a request for two data words D1, D2, followed by a request for another data word D5, a request for words D1, D2 again, a request for another word D6, and a request for four words D5–D8. In this example, data words D1 through D4 represent four consecutively addressed words that would be included in a first quadword, while data words D5 through D8 represent four other consecutively addressed words that would be included in a second quadword. The quadwords need not be consecutively addressed relative to each other.

FIG. 5 also shows the various bus control signals and the response on the data lines (DATA) of bus 34 when the requested data is provided to the CPU. A more detailed description of FIG. 5 is as follows:

In the first read request, the CPU requests data words D1 and D2 by specifying the corresponding addresses A1 and A2 on the address lines ADR, asserting the address valid signal ADV# for one clock cycle, and asserting the chip enable signal CE# for the duration of the transfer. In response, cache memory 36 asserts the WAIT# signal and keeps it asserted until the requested data is available. One clock cycle after asserting ADV#, the output enable signal OE# is asserted, and remains so until the requested information has been received. Assuming the requested address is not stored in cache, it may take several clock cycles (four cycles in the diagram) for the data to be retrieved from memory array 33 and the data for the first word D1 to be placed on the data lines DATA. One clock later, the data for the second word D2 is placed on the data lines. Signals CE# and OE# are immediately deasserted, and the requested transfer is complete. During that sequence, cache memory 36 can also place the requested data D1 and associated address into cache. Due to the previously described quadword architecture, the entire quadword that contains D1 may be stored. This places all the words D1 through D4 of the first quadword into cache.

As soon as the first request is complete, a second request can be made, this time by placing the address for data word D5 on the address lines ADR. Assuming this address is not already in cache, the same sequence of events as before can place the data for word D5 on the DATA lines several clock cycles after it was requested. During this sequence, the second quadword, containing words D5 through D8, can be stored in cache.

The next request shown in FIG. 5 is another request for data words D1 and D2. However, due to the first request above, D1 and D2 are now in cache. When the request is made, the data words D1 and D2 can be retrieved from data cache 45 rather than array 33. This shortens the response time, and the data for word D1 can be placed on the data lines one clock cycle after the request, with the data for word D2 following one clock cycle later.

The next request shown is for data word D6. Although D6 was not previously requested, the quadword containing D6 was placed into cache earlier when D5 was requested. The data for word D6 is therefore in cache and can be placed on the data lines one clock cycle after the request to read D6.

The next request shown is for a burst of the four data words D5 through D8. As previously described, the quadword containing D5 through D8 was placed into cache when D5 was requested. Therefore, this request will result in a cache hit, and words D5 through D8 can be presented from data cache 45 to multiplexer 48, where they can be sequentially placed on data lines D0–D15.

Figure 6:
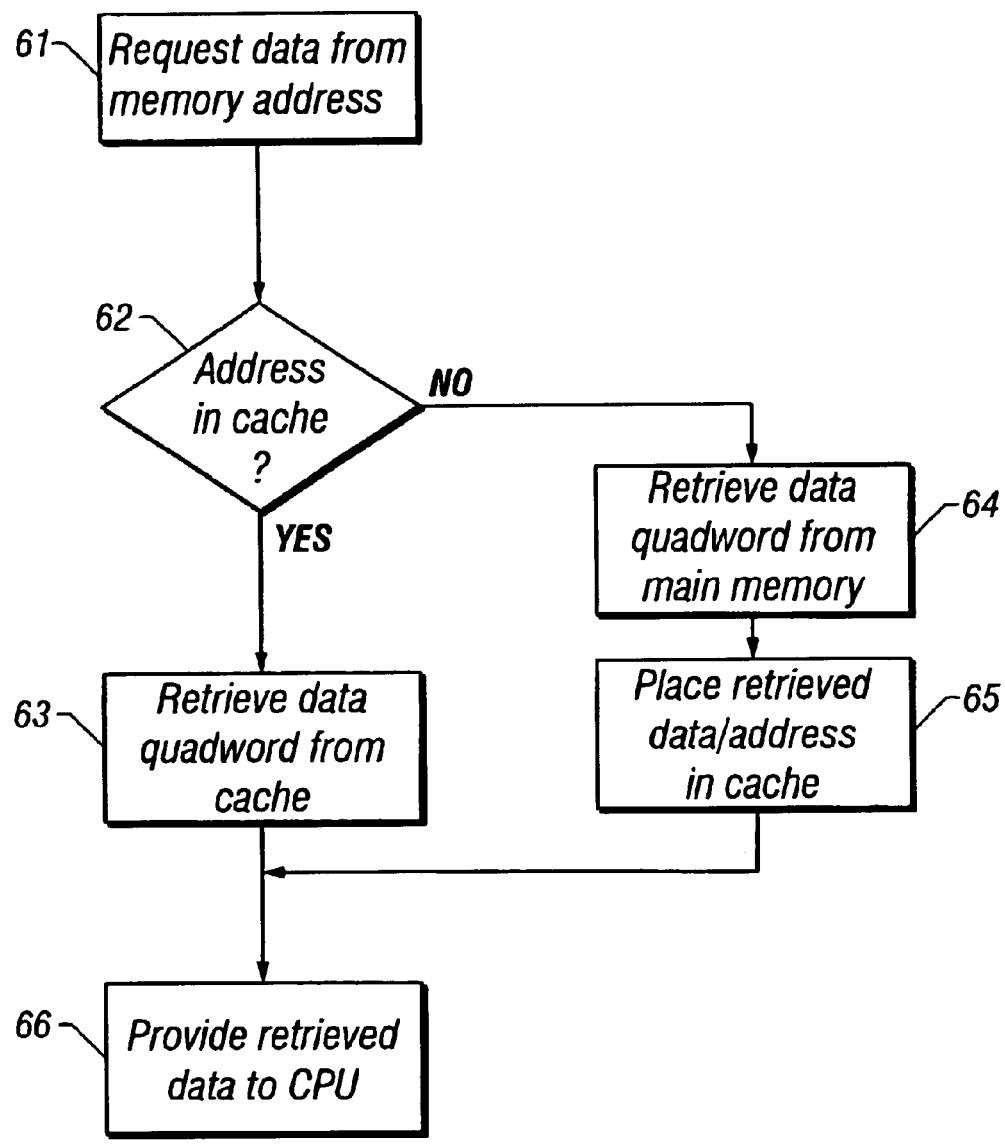
FIG. 6 shows a flow chart of a read request process.

FIG. 6 shows a flow chart of the operation of an embodiment of the cache memory in which the data transfer is not suspended by an interruption from another request. At block 61, a request is placed on the bus to read data from a specified memory address. This request can be for a single data word, or can be for multiple words within a quadword. At block 62, the address is examined to determine if it is in cache memory. If it is, the data is retrieved from cache memory at block 63. In one embodiment, the data is stored in cache in quadwords (four consecutively addressed words), and the entire quadword containing the data can be retrieved from cache. If the requested data is not in cache, the requested quadword of data can be retrieved from main memory at block 64. The retrieved data, and its associated address, can be placed in cache memory at block 65 so that the data will be available from cache for future requests to that same memory address. Regardless of whether the data was retrieved from cache or main memory, at block 66 the data can be provided over the bus to the requester, which can be a CPU. If the requested data was a single word, a single transfer over the bus may be sufficient. If the requested data was multiple words within the same quadword, the words can be transferred individually and sequentially over the bus.

Figure 7:
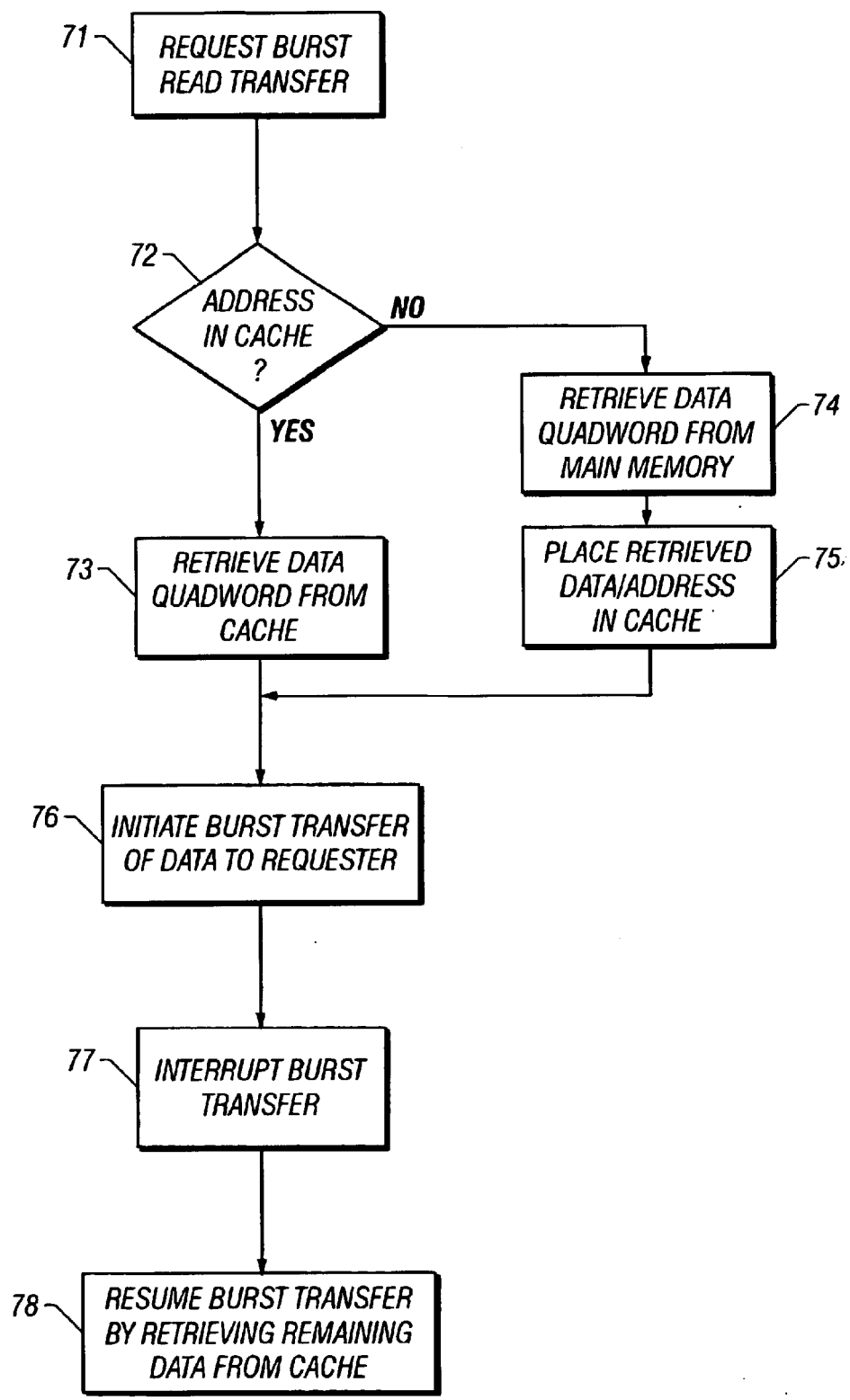
FIG. 7 shows a flow chart of an alternate read request process.

FIG. 7 shows a flow chart of the operation of an embodiment in which a burst transfer is suspended when it is interrupted by another request and is later resumed. At block 71, a read request is made for a burst transfer, i.e., a multi-word transfer involving sequential addresses within a quadword. At block 72, the quadword address is examined to determine if it is in cache memory. If it is, the data quadword is retrieved from cache memory at block 73. If the requested address cannot be found in cache, the requested quadword of data can be retrieved from main memory at block 74. The retrieved data, and its associated address, can then be placed in cache memory at block 75 so that the data will be available from cache for future requests to that same quadword memory address. Regardless of whether the data was retrieved from cache or main memory, at block 76 the burst transfer of data can be initiated over the bus to the requester, which can be a CPU, with the words being sequentially transferred over the bus. At block 77, this transfer is suspended due to an interruption, typically caused by another data request that has a higher priority. When the interrupting request is finished, the suspended burst transfer can be resumed at block 78 by retrieving the originally requested quadword of data from cache and continuing the transfer with the previously untransferred words. It should not matter at this point whether the original request found the data in cache, because if it was not there originally, it was placed there in block 75.

The foregoing description is intended to be illustrative and not limiting. Variations will occur to those of skill in the art. These variations are intended to be included in the invention, which is limited only by the spirit and scope of the appended claims. These variations include, but are not limited to, the following:

1) A memory that provides data in widths other than quadwords, such as bytes, words, double words, or other widths.
2) A bus that transfers data in widths other than 16-bit words, such as bytes, double words, quadwords, or other widths.
3) A bus that uses control signals other than those described.
4) A system that transfers data from non-contiguous memory addresses in a single burst.

I claim:

1. A system comprising:
   a processor; and
   a memory device coupled to the processor and contained within a single integrated circuit, the memory device including:
   a main memory,
   an address latch logic to receive addresses of requested data;
   a cache memory coupled to the processor and to the main memory to store recently accessed data and addresses associated with the recently accessed data, the cache memory including
   an address cache memory coupled to the address latch logic and a wait control logic to store the addresses of the recently accessed data and to store the address of the requested data after the requested data has been fetched, and
   a data cache memory coupled to the address cache memory and the main memory to store the recently accessed data, the data cache memory receiving data from the main memory if the data requested is not in the data cache memory;
   the wait control logic coupled to the processor, the main memory, and the cache memory to signal the processor whether the data currently requested is ready to be read;
   a multiplexer coupled to the data cache memory to select the requested data from the data cache memory; and
   a word count control logic coupled to the address latch logic and the multiplexer to control the multiplexer to selectively output the requested data using the multiplexer.

2. The system of claim 1, wherein the memory device further comprises a comparator coupled to the address latch logic and the address cache memory to determine whether the address stored in the address latch logic is in the address cache memory, an output of the comparator coupling to the wait control logic to cause the wait control logic transmitting one of the first and second signals to the processor dependent upon whether the address stored in the address latch logic is in the address cache memory.

3. The system of claim 2, wherein the comparator causes the wait control logic to assert the first signal to the processor to allow the processor to read in a next cycle the requested data presented by the data cache memory, if the address of the requested data is found in the data cache memory.

4. The system of claim 2, wherein the address latch logic receives the address of the requested data without two least significant bits of the address, wherein the address cache memory stores the address without the two least significant bits.

5. The system of claim 4, wherein the comparator compares the address of the requested data and the addresses stored in the address cache memory without comparing two least significant bits of the addresses.

6. The system of claim 1, wherein the address of the requested data is not presented to the main memory if the address of the requested data is found in the address cache memory.

7. The system of claim 1, wherein the cache memory can simultaneously hold multiple non-consecutive quadwords.

8. The system of claim 1, wherein the word count control logic receives two least significant bits of the address of the requested data, and wherein the two least significant bits are used to select up to four quadwords stored in the data cache memory to an output via the multiplexer.

9. The system of claim 8, wherein the word count control logic sequentially select one of the four quadwords using information of the two least significant bits, and wherein the sequential selection is driven by a clock signal received from a bus external to the memory device.

10. The system of claim 8, wherein the memory device further comprises an address counter logic coupled to the address latch logic and the main memory, and wherein the address counter logic receives the address of the requested data without two least significant bits and receives the two least significant bits of the address from the word count control logic, which when combined, selects the requested data from the main memory.

11. An apparatus comprising:
    a memory device capable of coupling to a processor through a bus, the memory device including on a single integrated circuit;

a main memory;

an address latch logic to receive addresses of requested data;

a cache memory coupled to the main memory to store recently accessed data and addresses associated with the recently accessed data, the cache memory including an address cache memory coupled to the address latch logic and a wait control logic to store the addresses of the recently accessed data and to store the address of the requested data after the requested data has been fetched, and a data cache memory coupled to the address cache memory and the main memory to store the recently accessed data, the data cache memory receiving data from the main memory if the data requested is not in the data cache memory;

the wait control logic coupled to the main memory and the cache memory to signal the processor through the bus whether the data currently requested is ready to be read;

a multiplexer coupled to the data cache memory to select the requested data from the data cache memory; and a word count control logic coupled to the address latch logic and the multiplexer to control the multiplexer to selectively output the requested data using the multiplexer.

12. The apparatus of claim 11, wherein the memory device further comprises a comparator coupled to the address latch logic and the address cache memory to determine whether the address stored in the address latch logic is in the address cache memory, an output of the comparator coupling to the wait control logic to cause the wait control logic transmitting one of the first and second signals to the processor dependent upon whether the address stored in the address latch logic is in the address cache memory.

13. The apparatus of claim 12, wherein the comparator causes the wait control logic to assert the first signal to the processor to allow the processor to read in a next cycle the requested data presented by the data cache memory, if the address of the requested data is found in the data cache memory.

14. The apparatus of claim 12, wherein the address latch logic receives the address of the requested data without two least significant bits of the address, wherein the address cache memory stores the address without the two least significant bits.

15. The apparatus of claim 14, wherein the comparator compares the address of the requested data and the addresses stored in the address cache memory without comparing two least significant bits of the addresses.

16. The apparatus of claim 11, wherein the cache memory can simultaneously hold multiple non-consecutive quadwords.

17. The apparatus of claim 11, wherein the word count control logic receives two least significant bits of the address of the requested data, and wherein the two least significant bits are used to select up to four quadwords stored in the data cache memory to an output via the multiplexer.

18. The apparatus of claim 17, wherein the word count control logic sequentially select one of the four quadwords using information of the two least significant bits, and wherein the sequential selection is driven by a clock signal received from a bus external to the memory device.

19. The system of claim 17, wherein the memory device further comprises an address counter logic coupled to the address latch logic and the main memory, and wherein the address counter logic receives the address of the requested data without two least significant bits and receives the two least significant bits of the address from the word count control logic, which when combined, selects the requested data from the main memory.

* * * * *

UNITED STATES PATENT AND TRADEMARK OFFICE
CERTIFICATE OF CORRECTION

PATENT NO.     : 6,836,816 B2
DATED          : December 28, 2004
INVENTOR(S)    : Kendall Page 1 of 1

It is certified that error appears in the above-identified patent and that said Letters Patent is hereby corrected as shown below:

Column 2,
Line 63, delete "Which" and insert -- In --.

Signed and Sealed this

Twenty-fourth Day of May, 2005

JON W. DUDAS
*Director of the United States Patent and Trademark Office*